W. A. SIMONDS.
APPARATUS FOR CARBONIZING AIR FOR ILLUMINATING PURPOSES.
No. 44,560. Patented Oct. 4, 1864.

Witnesses:

Inventor:

UNITED STATES PATENT OFFICE.

WARREN A. SIMONDS, OF BOSTON, MASSACHUSETTS.

IMPROVED APPARATUS FOR CARBONIZING AIR FOR ILLUMINATING PURPOSES.

Specification forming part of Letters Patent No. 44,560, dated October 4, 1864.

*To all whom it may concern:*

Be it known that I, WARREN A. SIMONDS, of Boston, in the county of Suffolk, State of Massachusetts, have invented a new and Improved Method for Carbonizing the Air for Illuminating Purposes; and I do hereby declare that the following is a full and exact description thereof, reference being had to the accompanying drawings, and to the letters of reference marked thereon.

The nature of my invention consists in the construction of a cylinder-shaped vessel or reservoir with a partition soldered crosswise around the top and in the center of the length of said cylinder to within about one inch of the center of its diameter, each side of which is one wheel, to revolve upon a shaft having bearings in the center of each head or ends of the cylinder, the wheels to have more or less spokes, as may be desired, with perforated hollow globes made fast to the ends of said spokes, for the purpose of facilitating in the vaporization of volatile liquids when used for carbonizing the air for illuminating purposes.

To enable others skilled in the art to make and use my invention, I will proceed to describe its construction and operation.

Figure 1:
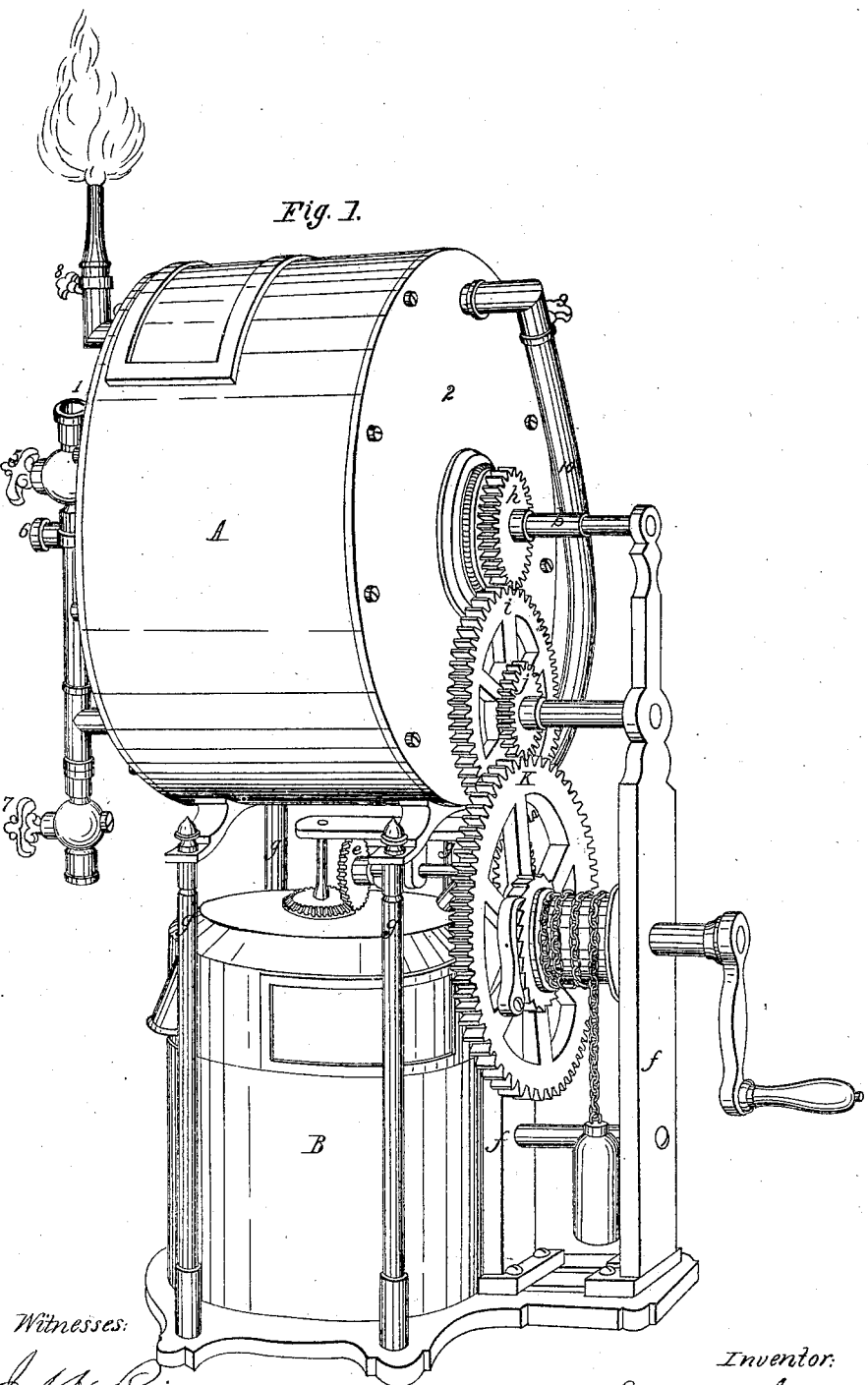
Figure 2:
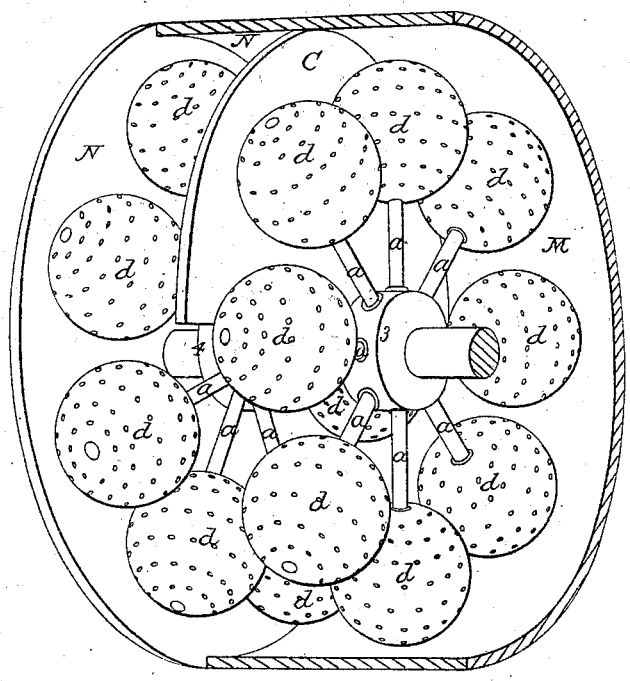

Figure 1 is a perspective view of my apparatus as used for carbonizing the air for illuminating purposes. Fig. 2 is an interior and sectional view of my carbonizer, showing the manner of vaporizing volatile liquids.

In Fig. 1 letter A represents the reservoir or carbonizing-vessel, with one partition, C, soldered across the top of the center to within about one inch of the center of the diameter. (Shown in Fig. 2.)

$b$ is a shaft, having a bearing upon the inside and center of head 1, and running parallel through cylinder A and through the center of head 2, upon which is a stuffing-box, to make it air-tight around shaft $b$ on head 2, and upon shaft $b$ are two wheels, 3 and 4, one each side of partition C, with more or less spokes, $a\ a\ a\ a$, connected to each hub 3 and 4, of such length as will revolve clear on shaft $b$ upon the inside of cylinder A, with perforated hollow globes $d$ fastened upon the ends of said spokes. The heads 1 and 2 are fastened to the cylinder with screws and the joints made tight with lead or leather.

Letter B is a pressure-meter or air-pump, which is operated by gear-wheels connected through to one end of frame and standard $ff$ with chain and weights. Cylinder A is fastened upon $g\ g$, and the agitators or wheels 3 and 4 are made to revolve by a gear-wheel, $h$, attached to the outside end of shaft $b$, in connection with gear-wheels I J K. Cock 5 on head 1 is for filling reservoir A with naphtha up to vent-cock 6. Cock 7 is for drawing off the liquids when too heavy for vaporization.

8 is an outlet-cock, connected with the supply-pipe to the burners. Cock 9 is attached to the air-supply, between the pressure-meter B and the inlet to cylinder or reservoir A.

To operate the above machine, cylinder or reservoir A should be filled with light and volatile naphtha about one-third full, which cock 6 will indicate when open; wind up chain with sufficient weight to work the pump B, and revolve shaft $b$ and agitators 5, wheels 3 and 4; open inlet-cock 9 and outlet or supply cock 8. The air is then forced from the meter through connecting-pipe 10, cock 9, into chamber or compartment M N, around wheel 3, down and under partition C, up and around wheel 4 to the outlet-cock 8, to the supply-pipes and burners.

I do not claim as my invention the agitation of volatile liquids with a wheel or wheels with cotton or other fibrous material attached thereto, as those are already in use; but

What I claim, and desire to secure by Letters Patent, is—

A wheel or wheels, with more or less spokes attached to each hub, and with perforated hollow globes made fast to each end of said spokes for agitating volatile liquids, when used for the purpose of carbonizing the air for illuminating purposes, as herein specified and described.

WARREN A. SIMONDS.

Witnesses:
JASON R. CUMMINGS,
JAMES E. DAWES.